April 17, 1934.           G. D. WHEAT           1,954,905
                            DRAG
                     Filed July 3, 1933          2 Sheets-Sheet 1

Inventor

Gus D. Wheat

By Clarence A. O'Brien
Attorney

April 17, 1934.　　G. D. WHEAT　　1,954,905
DRAG
Filed July 3, 1933　　2 Sheets-Sheet 2

Inventor
Gus D. Wheat
By Clarence A. O'Brien
Attorney

Patented Apr. 17, 1934

1,954,905

UNITED STATES PATENT OFFICE 1,954,905

DRAG

Gus D. Wheat, Rock Springs, Tex.

Application July 3, 1933, Serial No. 678,961

1 Claim. (Cl. 143—133)

My invention relates to devices for operating upon and clearing surfaces, and particularly a device for clearing a field of underbrush, and it is an important object of my invention to provide a device of this character which is to be dragged or drawn over the surface to be cleared so as to evenly and thoroughly cut and lay the underbrush and the like.

It is also an important object of my invention to provide a device of the character described above which has no moving parts but which is of a flexible rope-like character and is provided with means for severing the underbrush and the like as the underbrush is contacted thereby.

Other objects and advantages of my invention will be apparent from a reading of the following description in connection with the drawings, wherein for purposes of illustration I have shown a preferred embodiment of my invention.

In the drawings:—

Figure 1:
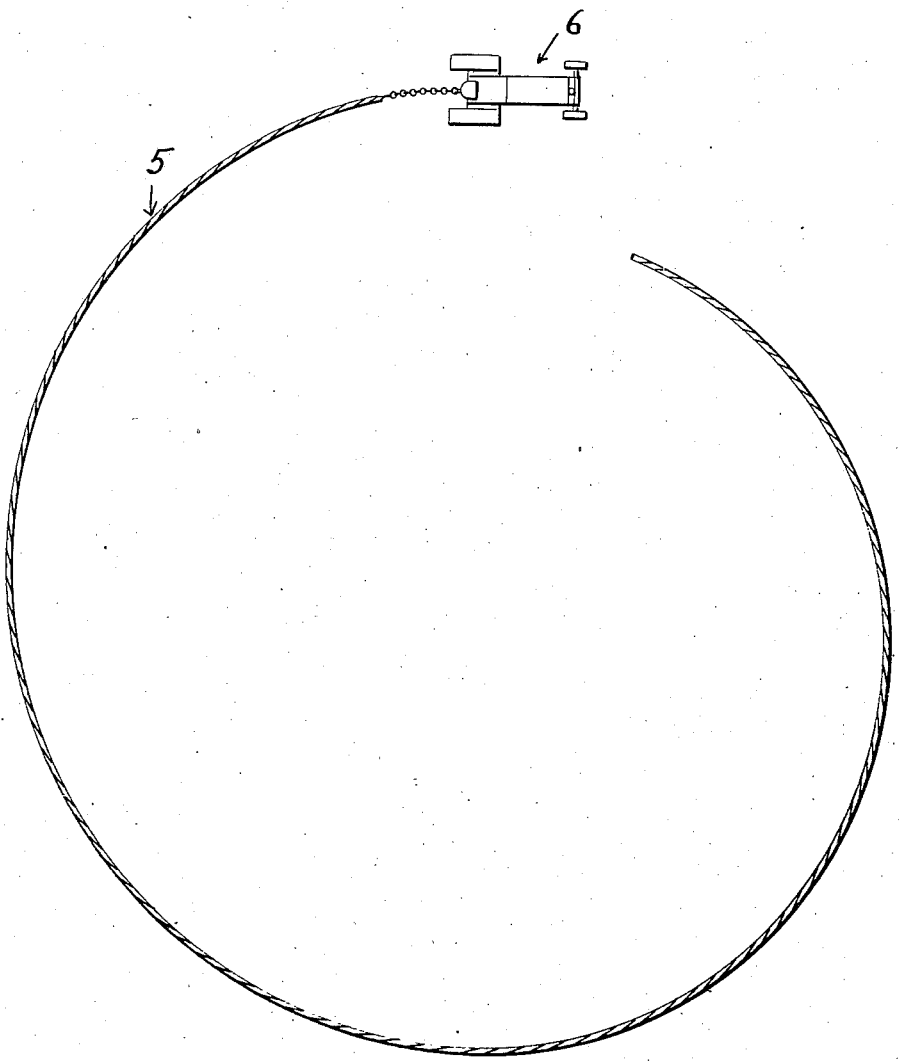
Figure 1 is a top view of an embodiment of the invention showing the manner in which it is drawn over a field by a tractor.

Referring in detail to the drawings, wherein like numerals refer to like parts throughout the same, the numeral 5 generally designates the embodiment which is of flexible rope-like character and is arranged to be drawn by a tractor 6 to which one end thereof is attached, in spirals or circles over the field to be cleared, so as to cause the embodiment to sweep the surface of the ground with a circular motion so as to bring the sides thereof to bear against the ground and against the underbrush, whereby the underbrush is severed from the ground and laid.

The embodiment 5 consists of a central solid flexible metal member 7 which will be preferably of steel from which radiate three or more flanges 8 which are of flexible band saw steel or the equivalent. The bands are provided with teeth 9, the bands being equally circumferentially spaced from each other and of equal width or depth.

Figures 2, 3:
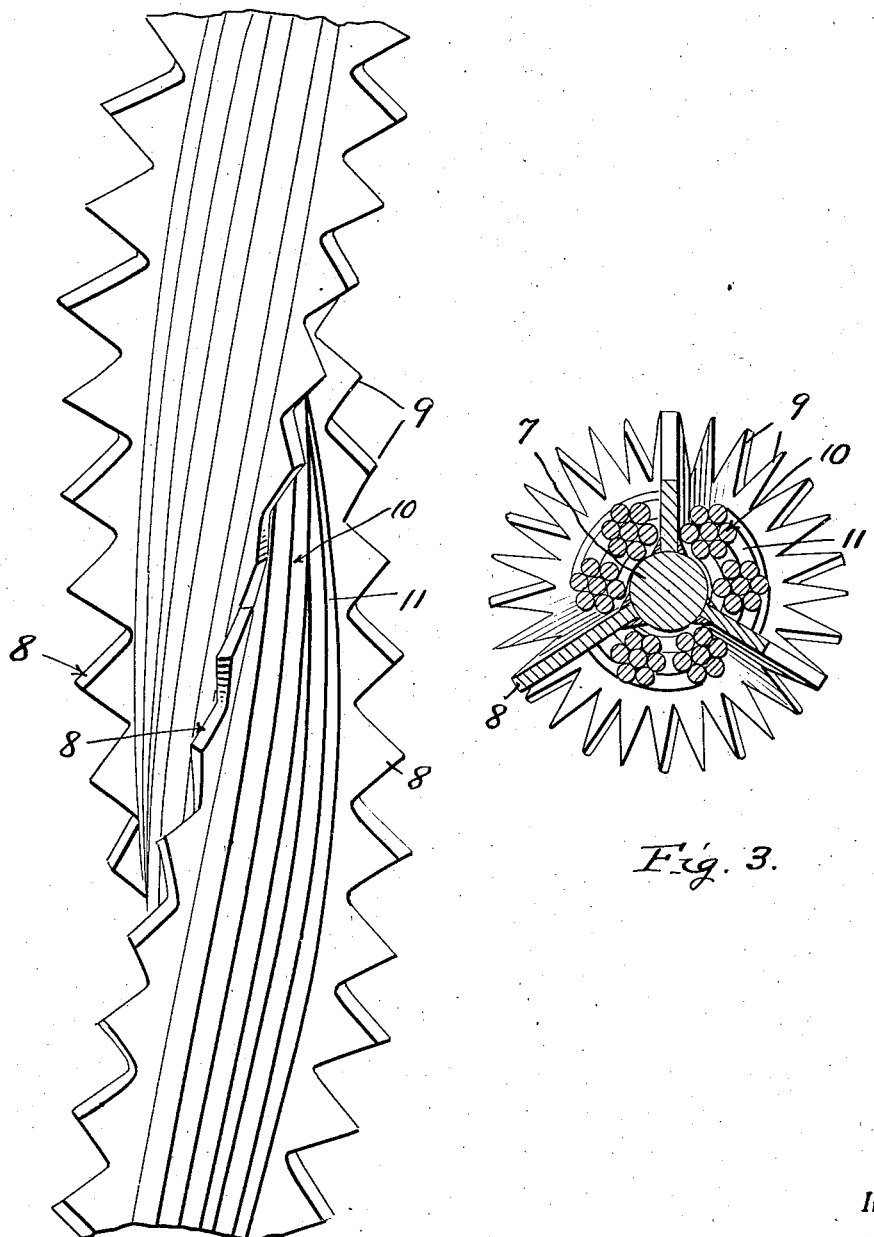
Figure 2 is a side elevational view of a portion of the embodiment.
Figure 3 is a transverse vertical sectional view through Figure 2.

The bands encircle the core 7 in a long spiral curve as exemplified in Figure 2, so that as the device is drawn over the ground it will produce an effect equivalent to that produced by a toothed roller upon the ground and upon the underbrush.

Surrounding the core 7 and located between each adjacent pair of the flanges 8 are two or more cables 10 each of which is made up of several smaller cables 11. The cables 10 are arranged longitudinally of the core and follow the curvature of each pair of companion flanges, so as to protect not only the core 7 and relieve the same of the strain of pulling the embodiment over the ground, but to protect the flanges against the effects of undue twisting and strain and against being broken by striking hard objects on the ground. It will be obvious that the cables 10 will be provided of sufficient tensile strength to resist all strains which may be imposed thereon as a result of the pull exerted by the tractor or the like as it draws the drag over the ground in the circular path referred to.

Although I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claim.

What is claimed is:—

A device of the class described comprising a long flexible cable having one end adapted to be connected to a tractor, said cable including a solid core, spirally arranged flanges radiating from the core and having teeth in their free edges and a number of cables located between each pair of flanges and contacting the core and spirally arranged to conform to the spiral arrangement of the flanges.

GUS D. WHEAT.